United States Patent [19]

Spencer

[11] Patent Number: 4,782,460
[45] Date of Patent: Nov. 1, 1988

[54] COMPUTING APPARATUS COMPRISING A PROGRAMMABLE RESISTOR

[75] Inventor: Edward G. Spencer, Berkeley Heights, N.J.

[73] Assignee: American Telephone and Telegraph Company, AT&T Bell Laboratories, Murray Hill, N.J.

[21] Appl. No.: 35,416

[22] Filed: Apr. 6, 1987

[51] Int. Cl.$^4$ ............................................. G06F 7/00
[52] U.S. Cl. ................................. 364/807; 307/201; 364/513
[58] Field of Search ... 364/200 MS File, 900 MS File, 364/807, 800, 801, 803, 513; 307/201; 382/14, 15; 252/500; 330/84, 86; 365/100, 148, 189, 218

[56] References Cited

U.S. PATENT DOCUMENTS

| | | | |
|---|---|---|---|
| 4,396,998 | 8/1983 | Hunt et al. | 365/100 |
| 4,518,866 | 5/1985 | Clymer | 307/201 |
| 4,590,589 | 5/1986 | Gerzberg | 365/100 |
| 4,660,166 | 4/1987 | Hopfield | 364/807 |
| 4,719,591 | 1/1988 | Hopfield et al. | 364/807 |

OTHER PUBLICATIONS

*Biological Cybernetics*, Springer-Verlag 1985, "Neural", Computation of Decisions in Optimization Problems" by J. J. Hopfield et al., pp. 141-152 (vol. 52).
*IEEE Transactions on Electron Devices*, vol. ED-27, No. 3, (Mar. 1980) "A Novel MOS PROM Using a Highly Resistive Poly-Si Resistor", by M. Tanimoto et al., pp. 517-520.
*Proc. Natl. Acad. Sci. USA*, vol. 81, May 1984, "Neurons with Graded Response Have Collective Computational Properties Like Those of Two-State Neurons", by J. J. Hopfield, pp. 3088-3092.

*Primary Examiner*—Joseph Ruggiero
*Attorney, Agent, or Firm*—Eugen E. Pacher

[57] ABSTRACT

Computing apparatus (e.g., a neural network) advantageously comprises a programmable resistor body comprising typically a multiplicity of resistors $R_{ij}$. The resistance of any given $R_{ij}$ is changeable from a relatively high resistance to a lower resistance by application of an appropriate electrical signal, and can be reset to a higher resistance by application of an appropriate signal of reverse polarity. Exemplarily, a programmable resistor body comprises a thin layer of bismuth oxide or strontium barium niobate.

9 Claims, 3 Drawing Sheets 4,782,460

COMPUTING APPARATUS COMPRISING A PROGRAMMABLE RESISTOR

FIELD OF THE INVENTION

This invention pertains to the field of computing apparatus such as, for instance, neural network computers.

BACKGROUND OF THE INVENTION

Computing apparatus of the neural network type has been described, for instance, by J. J. Hopfield in "Neurons With Graded Response Have Collective Computational Properties Like Those of Two-state Neurons"; *Proc. Natl. Acad. Sci., USA* Vol. 81, pp. 3088–3092 (1984), and by J. J. Hopfield and D. W. Tank in "Neural Computation of Decisions in Optimization Problems", *Biological Cybernetics*, Vol. 52, (1985), pp. 141–152; as well as in U.S. patent application Ser. No. 693,479 filed on behalf of J. J. Hopfield on Jan. 2, 1985, U.S. Pat. No. 4,660,166 and U.S. patent application Ser. No. 795,789 filed on behalf of J. J. Hopfield and D. W. Tank on Nov. 7, 1985, U.S. Pat. No. 4,719,591.

Basically, a so-called neural network is a highly parallel computational circuit comprising a plurality of (typically nonlinear) amplifiers, with typically each of the amplifiers feeding back its output signal to all of the other amplifiers through resistors of resistances $R_{ij}$. The resistors ($R_{ij}$ is the resistance of the resistor between the output of amplifier j and the input of amplifier i) and the associated connections can be thought of as comprising a feedback network which has one output signal set and two input signal sets. The output signal set is applied to the amplifier inputs, one of the input signal sets is derived from the amplifier outputs, and the other input signal set is responsive to input stimuli applied to the neural network. As shown in the prior art, one can explicitly specify the values of $R_{ij}$ to achieve predetermined results, such as reaching different specified output states of the amplifiers in response to different ranges of input stimuli.

According to the prior art, the specific problem to be solved is programmed, inter alia, by selecting appropriate values of the resistances $R_{ij}$. Since neural networks or other collective decision networks can be expected to consist of dozens, more likely hundreds or even thousands of amplifiers, such neural networks will contain tens of thousands or even millions of resistors. Clearly, such circuits can only be implemented by means of large scale integration.

The prior art knows neural networks implemented on a semiconductor chip, ref. and such networks have been used to solve such computational problems as the traveling salesman problem. However, these prior art networks are quite restricted in their applicability, since no practical way is known to the prior art for reprogramming such a chip, i.e., changing the values of the resistors. A different computer chip is thus necessary in order to solve a different problem. This clearly is not acceptable in practice, and a technique that allows reprogramming of the resistors is urgently needed, to be able to solve a variety of problems using the same chip. This application discloses an electrically programmable resistor which can advantageously be used in computing apparatus, including neural networks and the like.

The prior art knows that the resistance of samples of some materials can be changed by application of an appropriate electric field across such a sample. However, in these prior art materials the resistance change typically is due to an irreversible structural change in the material. See for instance, M. Tanimoto, et al, *IEEE Transactions on Electron Devices*, Vol. ED-27(3) pp. 517–520 (1980). Due to the irreversible nature of the change in these prior art materials, they do not lend themselves to the formation of programmable resistors of the type needed in computing apparatus as described above since, inter alia, once a resistor is formed in the material the material cannot conveniently be "reset" to its original high resistance state, or to some other high resistance state.

SUMMARY OF THE INVENTION

Figure 1:
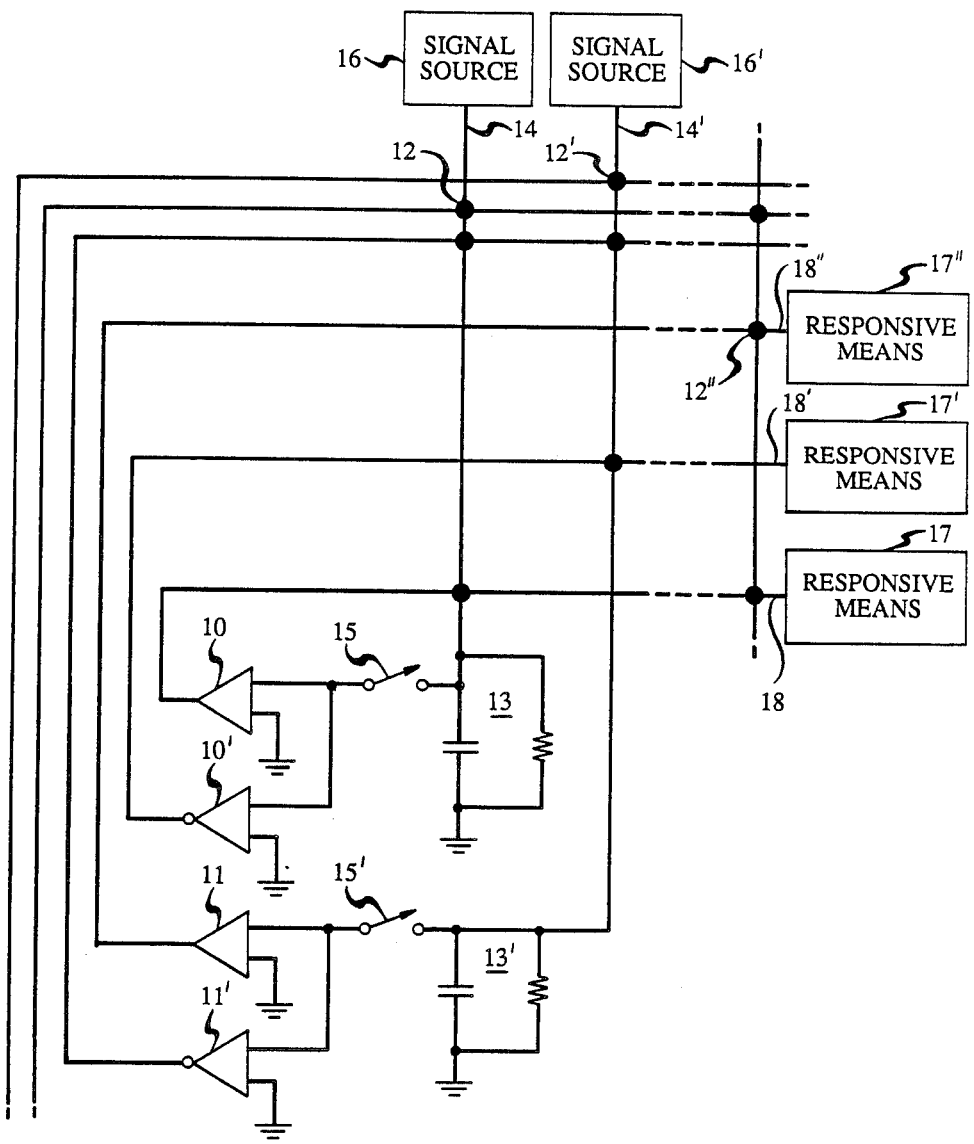
FIG. 1 is a schematic representation of exemplary computing apparatus according to the invention.

Disclosed is electronic computing apparatus that comprises a programmable resistor. The programmable resistor comprises a body, typically a thin layer, of which at least an active portion consists substantially of a material which has a relatively high resistivity state. The resistance associated with a predetermined portion of the body can be changed from the high resistance associated with the high resistivity state to a predetermined lower value of resistance. This is accomplished by application of an appropriate "write" voltage (typically comprising one or more voltage pulses) across the predetermined portion of the body. Furthermore, the resistance associated with the predetermined region of the body can be returned substantially to the original high resistance (or to an intermediate resistance) by application of an appropriate "erase" voltage (typically also comprising one or more voltage pulses of reversed polarity) across the predetermined portion of the body. Exemplary materials useful in the practice of the invention are based on bismuth oxides such as $Bi_2O_3$, and bismuth germanium oxides and bismuth silicon oxides such as $Bi_{12}GeO_{20}$, $Bi_{12}SiO_{20}$, and $Bi_4Ge_3O_{12}$. Other exemplary materials are the ferroelectric members of the $Sr_xBa_{1-x}Nb_2O_6$ system, with x being typically in the range 0.5–0.7.

The inventive computing apparatus typically comprises, in addition to a programmable resistor, a multiplicity of amplifier means (of which each has at least one input terminal and at least one output terminal), means for electrically connecting the output terminal of any given amplifier $A_j$ to the input terminal of at least one other amplifier $A_i$ such that the connecting conductive path comprises a path of resistance $R_{ij}$ through the active region of the programmable resistor body. The apparatus further comprises means for applying an electrical signal at least to the input terminal of one amplifier $A_i$, and means that are at least responsive to the output signal of at least one amplifier $A_j$ that is connected to $A_i$.

The programmable resistor body has a first and a second major surface (in this context the term "surface" is intended to include also an interface between a substrate body and a layer of material formed thereon, regardless of the composition of the layer formed on the substrate). Associated with the output terminal of any given $A_j$ is a portion $S_j$ of one of the two major surfaces, and with the input terminal of any given $A_i$ is associated a portion $S_i$ of the other major surface. Typically $S_i$ and $S_j$ are defined by means of electrodes that are in contact with the respective major surfaces. Exemplarily, the electrodes are photolithographically defined metal lines, with the lines on one surface disposed essentially at a right angle to those on the other surface. The input and output terminals of the various amplifier elements are conductively connected to the electrode that are associated therewith.

The apparatus further comprises means for applying the "write" and "erase" voltages between $S_i$ and $S_j$. By application of an appropriate "write" voltage a (typically substantially filamentary) path of predetermined resistance $R_{ij}$ can be formed in the material of the body between $S_i$ and $S_j$. This path completes the electrical connection between the input of $A_i$ and the output of $A_j$. It will be appreciated that a programmable resistor can typically also be used as a "switch". When used as a switch it is switched between two states, a high resistance state (frequently called $R_{off}$) and a low resistance state (frequently called $R_{on}$). Desirably $R_{off}/R_{on}$ is large, typically greater than $10^2$ or $10^3$.

A programmable resistor of the type disclosed herein is advantageously employed in computing apparatus, such as neural networks, content addressable memories, and other collective decision circuits. The term "computing apparatus" herein is used in a braod sense and is intended to encompass all apparatus that comprises means for logical processing of electrical signals. Such apparatus includes, for instance, image processors, means for image or voice recognition, "smart" robots, and decision-making and control units in microprocessors. Computing apparatus according to the invention is not necessarily of large scale but may be of relatively small scale (e.g., fewer than 100 computing amplifiers), or may consist of a unified arrangement of a multiplicity of relatively small computing units.

DETAILED DESCRIPTION OF SOME PREFERRED EMBODIMENTS

A distinguishing characteristic of computing apparatus according to the invention is the use of one or more programmable resistor bodies. In such a body the resistance of a given predetermined region can be set to substantially any resistance value (within a given resistance range) by means of an appropriate electrical "write" signal, and can be reset to the original high resistance state, or to some intermediate resistance state, by means of an appropriate electrical "erase" signal. Typically, the "write" signal comprises one or more pulses of one polarity (of amplitude, e.g., in the range 1–5 volt), and the "erase" signal comprises one or more pulses of the opposite polarity (e.g., also of amplitude in the 1–5 volt range). Both (or either) of the signals may also comprise an appropriate DC bias voltage.

The "resistors" (i.e., the portions of material associated with any given pair of $S_i$ and $S_j$) are formed in a matrix of an appropriate relatively high resistivity material. The material can be monocrystalline, polycrystalline, or amorphous, and frequently is an inorganic oxide. In currently preferred embodiments, the programmable resistor body is a thin layer of material that was deposited by a known technique (e.g., sputtering) on an appropriate substrate (e.g., an insulator such as $Al_2O_3$).

The programmable resistor body typically is an appropriately doped insulator. Individual members of the dopant species will be referred to as "ions", without intending to thereby limit the nature of possible dopants. For instance, "ions" is intended to include crystal defects such as vacancies. The doping level is chosen such that, for randomly distributed dopant ions, the room temperature resistivity of the doped material is still relatively high. It is generally desirable that the ratio between maximum resistance ($R_{off}$) and minimum resistance ($R_{on}$) be at least $10^2$ and preferably be of order $10^3$ or even larger. Although a programmable resistor having $R_{off}$ of order $10^7 \Omega$ has utility, it is preferred that $R_{off}$ be of the order of $10^{10} \Omega$ or larger, more preferably of order $10^{12}$ or even $10^{13} \Omega$.

It is currently believed that the following physical mechanism may operate in at least some programmable resistor materials. Application of a sufficiently high voltage across, e.g., a thin film of the doped material is believed to cause some elongation of the charge clouds associated with the dopant ions, and to furthermore cause the charge clouds to substantially line up in more or less well defined order along the direction of the applied field. The local charge clouds of the individual ions thus are caused to overlap to some degree those of their neighbors to form a cooperative, long range, microscopic size conducting path through the film. Furthermore, it is believed that, if this cooperative effect is strong enough, a sharply defined strain field is produced along the electrically conductive path. The strain field lines are likely to terminate at existing stress points in the material. By increasing the applied field further, an even stronger strain field is produced which in turn is thought to be likely to produce additional terminal stress points. These new semipermanent stress points are thought to maintain the stress field, and hence the conducting path, in a metastable state.

The resistance of such a path can be increased to substantially its original high value by applying a reverse voltage. It is believed that this tends to reverse a portion of the charge cloud of the ions. A smaller reverse voltage is thought to be sufficient to break a few links in the chain of overlapping charge clouds.

The above described mechanism is presented only as a possible aid to the understanding of the invention, and is in no way intended to limit the invention. It is expected that a variety of materials will be found that can advantageously be used to produce programmable resistors according to the invention, and that some of these materials will perhaps rely on physical principles that have not yet been determined in detail. All such materials and physical principles are considered to be within the scope of the invention, provided the material permits formation of a resistor of predetermined resistance by application of a "write" voltage to a portion of a film or other body consisting essentially of the material, and significantly, return of the portion of the material to or higher, preferably substantially the original, resistance by application of an "erase" voltage across the portion.

Among the materials that are currently preferred are oxides and mixed oxides, in particular, materials based on bismuth sesquioxide. These include $Bi_2O_3$, $Bi_{12}GeO_{20}$, $Bi_{12}SiO_{20}$, and $Bi_4Ge_3O_{12}$. The exemplary materials melt congruently, and can readily be grown in bulk single crystal form. High quality crystalline thin films can be produced by a variety of methods, including vapor deposition, liquid phase epitaxy, and sputtering. In stoichiometric proportions the above oxides are insulators, with typical measured resistivities in the order of $10^{10}$ to $10^{13}$ $\Omega$-cm. Other materials useful in the practice of the invention such as strontium barium niobate can also be deposited by known techniques such as evaporation and sputtering.

A possible (and the currently preferred) dopant species for the above Bi oxides is an oxygen vacancy. That is to say, the resistivity of the above oxides can be brought into the appropriate range by control of the degree of oxygen deficiency in the material. The oxygen vacancies can exist as single or double vacancies, and can be in a positive, negative, or neutral charge state. The conduction process in such an oxygen-deficient Bi-based oxide is believed to involve motion of electrons, under the influence of an applied electric field, along a line of oxygen vacancies in a direction defined by the applied field, substantially as described above. The amount of oxygen deficiency required to obtain useful resistivities is small (exemplarily a few parts per million) and therefore difficult to measure and specify numerically. It has been found advantageous to fine tune the manufacturing conditions (e.g., the deposition and annealing conditions) so as to result in samples having the desired resistivity.

Exemplarily, bismuth oxide-based programmable resistor bodies are produced by a process that comprises deposition of a layer of the oxide onto a substrate by argon ion beam sputtering from a target of high purity oxide (e.g., $Bi_2O_3$, $Bi_4Ge_3O_{12}$, $Bi_{12}GeO_{20}$, and $Bi_{12}SiO_{20}$), or by thermal evaporation from a melt of high purity oxide in a Pt crucible (melt temperature typically 1400°–1500° C.). The sputtering chamber typically is flooded with oxygen (about $10^{-5}$ Torr) during deposition. The evaporation is carried out in a vacuum chamber with, typically, a pressure of $10^{-2}$ Torr of pure oxygen. Exemplarily, the substrate may be kept at elevated temperature (e.g., 550°–750° C.) during deposition. Alternatively, the substrate may be maintained at room temperature during oxide deposition. If necessary to achieve the desired composition, the oxide films may be annealed, typically at about 400°–750° C. in pure $O_2$. Annealing times are frequently in the range 15 minutes–2 hours. The procedure generally results in almost transparent material of light yellow color, indicating almost complete oxidation. The thus produced oxide films typically are polycrystalline. In Ge- or Si-containing Bi-oxides, the above exemplary procedures result typically in ordering of Ge or Si, respectively. The presence of this ordering can be verified by means of X-ray diffraction.

FIG. 1 schematically shows a portion of a "neural network" computing apparatus according to the invention. This particular embodiment comprises parallel combinations of non-inverting amplifiers (10, 11, ... ) and inverting amplifiers (10', 11', ... ). Filled circles 12, 12', 12", ... represent individual resistors $R_{ij}$ in an inventive programmable resistor, RC networks 13, 13', ... serve as low-pass filters at the input of the amplifiers, and switches 15, 15', ... provide means for isolating the amplifier inputs from the network, e.g., during a "write" or "erase" procedure. 14, 14', ... are input conductors, 16, 16', ... symbolically indicate means for generating input signals and/or "write" and "erase" signals, 18, 18', 18" are output conductors, with 17, 17', 17", ... symbolically indicating means responsive to the output signals and/or means for applying, in cooperation with the j-th one of means 14, 14', a "write" or "erase" signal to any given $R_{ij}$.

Figure 2:
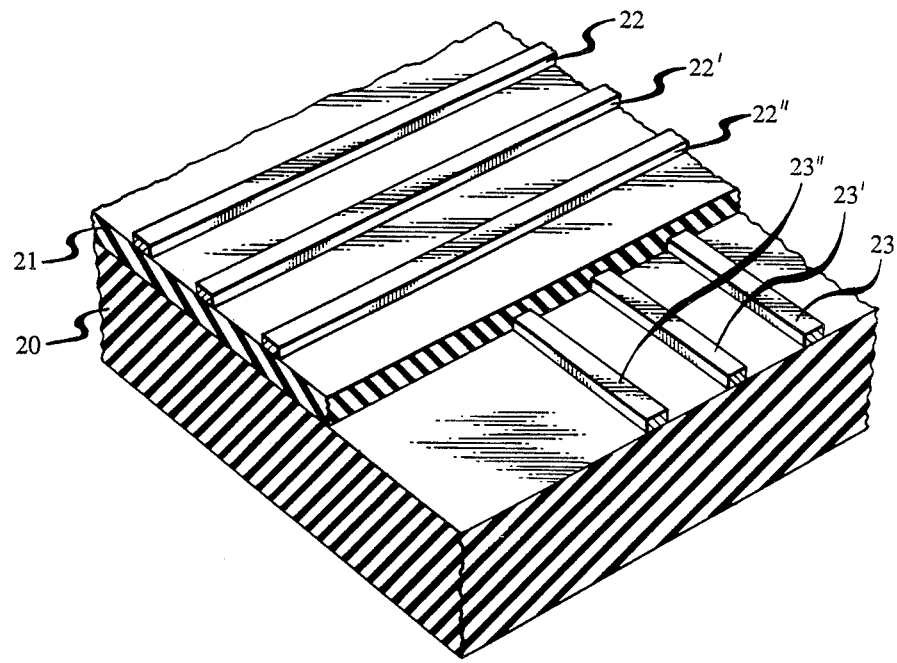
FIG. 2 schematically depicts a programmable resistor body on a substrate.

FIG. 2 depicts schematically a portion of a programmable resistor body 21 supported by substrate 20. A set of spaced apart linear conductors 23, 23', 23", ... is formed on 20 prior to formation of 21 thereon, and a second set of linear conductors 22, 22', 22" is formed on 21. The intersection of the i-th conductor of the first set and the j-th conductor of the second set defines the portion of the body associated with resistor $R_{ij}$ (or $R_{ji}$, depending on the external connections).

Figure 3:
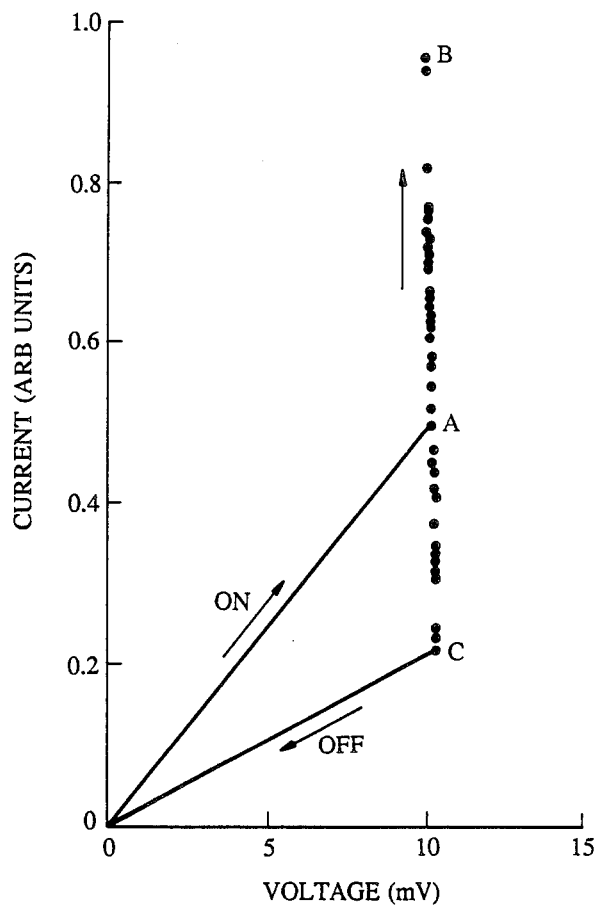

The results of a programming sequence performed on a single region of a programmable resistor body is schematically shown in FIG. 3. Application of a "write" voltage formed a resistor of a particular intermediate value associated with point "A" in FIG. 3. The "on" curve was obtained by increasing the bias voltage across the resistor from 0 to 10 mv. Application of positive pulses (0.15 V, 10 $\mu$sec width) resulted in a stepwise increase of the current through the resistor, as indicated by the dots from "A" to "B". Application of negative pulses ($-0.15$ V, 10 $\mu$sec width) resulted in a stepwise decrease of the current through the resistor from "B" to "C". Decrease of the bias from 10 mV to 0 resulted in the "off" curve.

Figure 4:
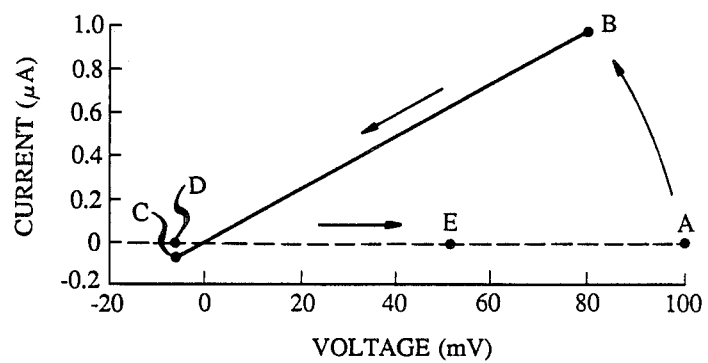
FIGS. 3 and 4 give results on the characteristics of exemplary programmable resistors.

FIG. 4 shows data on an 0.3 $\mu$m thick film of (oxygen deficient) crystalline $Bi_2O_3$ on sapphire, with 1 $\mu$m wide conductor lines (Pt). The original resistance corresponds to point "A". Application of a 4 volt pulse decreased the resistance to about $10^5$ $\Omega$ (point "B"). After reducing the bias to zero the bias was set to $-5$ mV (point "C") and four $-3$ V pulses applied. This caused the resistor to reset to substantially the original high resistance value (point "D"). This value was maintained also for a $+50$ mV bias (point "E").

Example I

On a polished sapphire substrate a 0.5 $\mu$m thick layer of Pt was deposited by DC triode sputtering. By standard photolithography and ion milling techniques a 1 $\mu$m wide straight conductor element was produced from the deposited Pt layer. Onto the substrate and a portion of the conductor was then deposited a 0.3 $\mu$m thick layer (7 $\times$ 1 mm) of $Bi_2O_3$ by argon beam sputtering from a target of hot pressed polycrystalline high purity $Bi_2O_3$. The deposition chamber was at $10^{-5}$ Torr, with $O_2$ being flowed through the chamber. The resulting oxide layer was annealed (20 minutes at 550° C.) in 0.1 Torr of $O_2$. Subsequently 20 straight conductor elements (0.5 $\mu$m thick Pt lines, 1 $\mu$m width) were formed, at right angles to the bottom conductor element, by DC triode sputtering and standard photolithography and ion milling techniques. The thus formed programmable resistor was tested by means of conventional programmable pulse generators, power supplies, current and voltage measuring devices. The virgin material had a resistivity of about $10^5$ $\Omega$-cm ($R_{off}$ was about $10^9$ $\Omega$). Application of a pulse (4 volt, 10 $\mu$sec width) between the bottom conductor and one of the top conductors resulted in a decrease of the resistance between the two conductors by three orders of magnitude to about $10^6$ $\Omega$.

Example II

A programmable resistor was prepared substantially as described in Example I, except that $Bi_{12}GeO_{20}$ was used instead of $Bi_2O_3$, and that the bottom and top conductors consisted of Au. Application of a sequence of pulses (0.15 volt, 10 $\mu$sec width) between the bottom conductor and a top conductor decreased the resistance between the two conductors in steps (average current increase at constant voltage was 10 nA) to $10^4$ Ω. Application of a sequence of pulses of opposite polarity (−0.15 volt, 10 μsec width) increased the resistance between the conductors in steps to about $5 \times 10^4$ Ω.

Example III

A further programmable resistor was prepared substantially as described in Example I, except that the sputtering target consisted of high purity single crystal $Bi_4Ge_3O_{12}$ and that the anneal was carried out at 750° C. By application of 3.5 V pulses the resistance between the bottom conductor and a top conductor was changed in steps from the initial value of $2.2 \times 10^9$ Ω to $5 \times 10^5$ Ω. A further pulse caused a decrease to $1.2 \times 10^4$ Ω.

Example IV

On a polished sapphire substrate a 0.5 μm thick layer of Pt was deposited by DC triode sputtering. By standard photolithography and ion milling techniques a 1 μm wide straight conductor element was produced from the deposited Pt layer. Onto the substrate and a portion of the conductor was then deposited a 0.3 μm thick layer (7×1 mm) of $Bi_{12}GeO_{20}$ by thermal evaporation of polycrystalline high purity $Bi_{12}GeO_{20}$. The deposition chamber was at $10^{-5}$ Torr, with $O_2$ being flowed through the chamber. During deposition the substrate was maintained at 550° C. Subsequently 20 straight conductor elements (0.5 μm thick Pt lines, 1 μm width) were formed, at right angle to the bottom conductor element, by DC triode sputtering and standard photolithography and ion milling techniques. The thus formed programmable resistor is tested substantially as described in Example I. The virgin material has a resistivity of about $10^8$ Ω-cm ($R_{off}$ is about $10^{12}$ Ω). Application of a pulse (4 volt, 10 μsec width) between the bottom conductor and one of the top conductors results in a decrease of the resistance between the two conductors by four orders of magnitude to about $10^8$ Ω. Application of a pulse of reverse polarity returns the resistance to approximately $10^{12}$ Ω.

What is claimed is:

1. Electronic computing apparatus comprising
   (a) a multiplicity of amplifier means, each one of the amplifier means having at least one input terminal and at least one output terminal;
   (b) means for electrically connecting the output terminal of any given amplifier means $A_j$ to the input terminal of at least one other amplifier means $A_i$, the electrical connection having a predetermined resistance;
   (c) means for applying an electrical signal at least to the input terminal of one of the amplifier means; and
   (d) means that are responsive to the output signal of at least one of the amplifier means;
   characterized in that
   (e) the means of (b) comprise a programmable resistor body consisting substantially of a material having a state of relatively high resistivity and having a first and second major surface, a portion $S_i$ of the first surface being associated with $A_i$ and a portion $S_j$ of the second surface being associated with $A_j$, associated with the programmable resistor body is a resistance $R_{ij}$ between $S_i$ and $S_j$, the value of $R_{ij}$ being changeable from a relatively high value associated with the state of relatively high resistivity to a lower value by application of a "write" voltage between $S_i$ and $S_j$, and the value of $R_{ij}$ being furthermore changeable from the lower value to a higher value by application of an "erase" voltage between $S_i$ and $S_j$; and
   (f) the apparatus further comprises means for applying the "write" voltage and the "erase" voltage between $S_i$ and $S_j$, such that a predetermined resistance $R_{ij}$ can be formed between $S_i$ and $S_j$, and such that the electrical connection of predetermined resistance between the input terminal of $A_i$ and the output terminal of $A_j$ is established.

2. Apparatus of claim 1, wherein the programmable resistor body is a relatively thin layer and wherein at least one of the first and second major surfaces is an interface between the layer and a layer-supporting substrate.

3. Apparatus of claim 1, wherein the material in the relatively high resistivity state has a resistivity that is greater than about $10^5$ Ω-cm at room temperature.

4. Apparatus of claim 3, wherein at room temperature the maximum value of $R_{ij}$ is greater than about $10^{10}$ Ω.

5. Apparatus of claim 1, wherein application of the "write" voltage comprises application of one or more voltage pulses of a given polarity, and wherein application of the "erase" voltage comprises application of one or more voltage pulses of polarity opposite to the given polarity.

6. Apparatus of claim 1, wherein the output terminal of substantially any given amplifier means $A_j$ is electrically connected to the input terminals of a multiplicity of amplifier means, with the given amplifier means $A_j$ optionally being a member of the multiplicity of amplifier means.

7. Apparatus of claim 1, wherein the apparatus is a neural network computer.

8. Apparatus of claim 1, wherein the material having a state of relatively high resistivity is selected from the class consisting of materials of nominal composition $Bi_2O_3$, $Bi_{12}GeO_{20}$, $Bi_{12}SiO_{20}$, $Bi_4Ge_3O_{12}$, and $Sr_xBa_{1-x}Nb_2O_6$ ($0.5 \leq x \leq 0.7$).

9. Apparatus of claim 8, wherein the material is slightly oxygen deficient.

* * * * *